United States Patent
Takagi et al.

(10) Patent No.: US 9,661,826 B2
(45) Date of Patent: May 30, 2017

(54) ABSORBENT SHEET FOR PETS AND PRODUCTION METHOD FOR ABSORBENT SHEET FOR PETS

(71) Applicant: UNI-CHARM CORPORATION, Ehime (JP)

(72) Inventors: Chiyo Takagi, Kagawa (JP); Takeshi Ikegami, Kagawa (JP)

(73) Assignee: Unicharm Corporation, Ehime (JP)

( * ) Notice: Subject to any disclaimer, the term of this patent is extended or adjusted under 35 U.S.C. 154(b) by 0 days.

(21) Appl. No.: 14/413,041

(22) PCT Filed: Jun. 20, 2013

(86) PCT No.: PCT/JP2013/067011
§ 371 (c)(1),
(2) Date: Jan. 6, 2015

(87) PCT Pub. No.: WO2014/007073
PCT Pub. Date: Jan. 9, 2014

(65) Prior Publication Data
US 2015/0201579 A1    Jul. 23, 2015

(30) Foreign Application Priority Data
Jul. 6, 2012  (JP) ................. 2012-153045

(51) Int. Cl.
*A01K 29/00* (2006.01)
*A01K 1/015* (2006.01)
(Continued)

(52) U.S. Cl.
CPC .......... *A01K 1/0157* (2013.01); *A01K 1/0107* (2013.01); *A01K 1/0152* (2013.01);
(Continued)

(58) Field of Classification Search
CPC .... A01K 1/0157; A01K 1/052; A01K 1/0107; A01K 1/0353; A01K 1/0114;
(Continued)

(56) References Cited

U.S. PATENT DOCUMENTS 4,774,907 A * 10/1988 Yananton ............. A01K 1/0152
119/169
5,630,376 A *  5/1997 Ochi ..................... A01K 1/0107
119/169
(Continued)

FOREIGN PATENT DOCUMENTS

CN     1644037        7/2005
EP     1 554 927 A1   7/2005
(Continued)

OTHER PUBLICATIONS

International Search Report from corresponding PCT application No. PCT/JP2013/067011 dated Sep. 24, 2013 (4 pgs).
(Continued)

*Primary Examiner* — Jennifer E Novosad
(74) *Attorney, Agent, or Firm* — Brinks Gilson & Lione

(57) ABSTRACT

An absorbent sheet for pets, having a fluid-permeable surface sheet that receives pet excrement, a fluid-impermeable rear sheet, and an absorbent body that absorbs fluid that has penetrated the surface sheet. The surface sheet is configured so as to receive pet excrement, in a state in which the rear sheet is placed in a placement location; the absorbent body is configured as a non-embossed area having a surface-side covered sheet, a rear-side covered sheet, and an absorbent layer; a main absorbent section for excrement is provided in the center area of the absorbent body; and the basis weight in at least the main absorbent area in the absorbent body is set so as to be substantially uniform at a prescribed value.

3 Claims, 4 Drawing Sheets

(51) Int. Cl.
*A01K 1/01* (2006.01)
*B32B 37/10* (2006.01)
*B32B 37/18* (2006.01)

(52) U.S. Cl.
CPC .......... *B32B 37/1027* (2013.01); *B32B 37/18* (2013.01); *B32B 2307/726* (2013.01)

(58) Field of Classification Search
CPC .. A01K 1/0125; A01K 1/0155; A01K 1/0154; A01K 1/015; A01K 23/005; A01K 1/001; A01K 1/057; A01K 29/00; B32B 37/18; B32B 37/1027; B32B 2307/726; A61F 13/15; A61F 13/49; A61F 13/53; A61F 13/514; A61F 2013/5145; A61F 13/51478; A61F 13/52
USPC .............. 119/169–173, 167, 165, 28.5, 161; 604/370, 372, 378, 379, 381, 385.01, 604/385.02, 358, 366, 368, 374, 377
See application file for complete search history.

(56) References Cited

U.S. PATENT DOCUMENTS

| | | | |
|---|---|---|---|
| 7,493,870 B2* | 2/2009 | Takahashi | A01K 1/0107 119/171 |
| 7,891,320 B2* | 2/2011 | Otsuji | A01K 1/0107 119/169 |
| 8,468,973 B2* | 6/2013 | Sasano | A01K 1/0107 119/169 |
| 2004/0255869 A1* | 12/2004 | Matsuo | A01K 1/0107 119/170 |
| 2005/0000462 A1* | 1/2005 | Matsuo | A01K 1/0114 119/171 |
| 2005/0166855 A1* | 8/2005 | Kaneko | A01K 1/0107 119/169 |
| 2005/0166856 A1* | 8/2005 | Kaneko | A01K 1/0107 119/169 |
| 2009/0000557 A1 | 1/2009 | Takahashi et al. | |
| 2009/0000561 A1* | 1/2009 | Takahashi | A01K 1/0107 119/171 |
| 2011/0146581 A1* | 6/2011 | Sasano | A01K 1/0107 119/171 |
| 2011/0232578 A1* | 9/2011 | Duke | A01K 1/0107 119/172 |
| 2012/0165776 A1 | 6/2012 | McGregor et al. | |
| 2013/0206076 A1* | 8/2013 | Komatsubara | A01K 1/0107 119/171 |
| 2015/0027380 A1* | 1/2015 | Sasano | A01K 1/0157 119/161 |
| 2015/0150212 A1* | 6/2015 | Takagi | A01K 1/0107 119/161 |
| 2015/0164038 A1* | 6/2015 | Takagi | A01K 1/0157 119/161 |
| 2015/0189852 A1* | 7/2015 | Takagi | A01K 1/0107 119/172 |
| 2015/0189853 A1* | 7/2015 | Takagi | A01K 1/0107 119/171 |
| 2015/0201579 A1* | 7/2015 | Takagi | A01K 1/0107 119/171 |

FOREIGN PATENT DOCUMENTS

| | | |
|---|---|---|
| JP | 2005-198598 A | 7/2005 |
| JP | 2011-205970 A | 10/2011 |
| JP | 2011-205979 A | 10/2011 |

OTHER PUBLICATIONS

Chinese Office Action and English translation from corresponding Chinese application No. CN 201300035996.3 dated Jul. 29, 2015 (10 pgs).
European extended Search Report from corresponding European application No. 13813810.2 dated Feb. 10, 2016 (9 pgs).
Japanese Office Action from corresponding Japanese application No. JP2012-153045 dated Jan. 28, 2016 (11 pgs).
Australian Office Action from corresponding Australian application No. 2013284681 dated Nov. 8, 2016 (3 pgs).
International Preliminary Report on Patentability and Written Opinion from corresponding PCT application No. PCT/JP2013/067011 dated Jan. 6, 2015 (10 pgs).

* cited by examiner

ABSORBENT SHEET FOR PETS AND PRODUCTION METHOD FOR ABSORBENT SHEET FOR PETS

RELATED APPLICATIONS

This application is a 35 U.S.C. §371 national phase filing of International Patent Application No. PCT/JP2013/067011, filed Jun. 20, 2013, through which and to which priority is claimed under 35 U.S.C. §119 to Japanese Patent Application No. 2012-153045, filed Jul. 6, 2012.

TECHNICAL FIELD

The present invention relates to a technique for constructing an absorbent sheet for pets and a method for manufacturing the absorbent sheet for pets.

BACKGROUND ART

Japanese Unexamined Patent Application Publication No. JP2011-205979 A discloses an absorbent sheet for pets, having a liquid-permeable top sheet, a liquid-impermeable back sheet and an absorber disposed between the top sheet and the back sheet.

In this prior art, the top sheet, the absorber and a second sheet disposed between the top sheet and the absorber are integrally bonded together by embossing. The embossing here refers to a technique of press-forming a predetermined concave or convex pattern in the absorbent sheet by feeding and pressing a sheet material onto a roll or a plate having concaves or convexes. The prior art absorbent sheet is integrally formed by forming a concave or convex pattern in a predetermined region by such embossing.

In the above-described absorbent sheet integrally formed by embossing, the embossed absorber (and top sheet) has a region having a relatively high basis weight compared with a non-embossed region. Excrement from pets has a high moisture content and thus widely diffuses in the surface direction of the absorbent sheet along the embossed region having a high basis weight.

The prior art aims to promote diffusion of the excrement in the surface direction of the absorbent sheet in order to avoid excrement from being locally concentrated in the absorbent sheet.

As a general habit of pets, however, pets tend to avoid excreting again on a place which has been used once. If excrement widely diffuses, pets may not excrete on the same absorbent sheet again. Therefore, this is inconvenient contrary to the object of the absorbent sheet designed to serve for several times of excretion. In this respect, an improved technique is desired to be provided for absorbing excrement in a well-balanced manner while effectively preventing not only local concentration of excrement but excessive diffusion of excrement.

PRIOR ART DOCUMENT

Patent Document

Patent Document 1: JP 2011-205979 A

SUMMARY OF THE INVENTION

Problem to be Solved by the Invention

Accordingly, it is an object of the present invention to provide a technique for effectively absorbing excrement in an absorbent sheet for pets.

Means for Solving the Problem

The above-described problem is solved by the present invention as defined in claims. In order to solve the problem, an absorbent sheet for pets according to the present invention is provided which has a liquid-permeable top sheet that receives excrement of pets, a liquid-impermeable back sheet, and an absorber that is disposed between the top sheet and the back sheet and absorbs liquid which has penetrated the top sheet. The top sheet is configured to receive excrement of pets with the back sheet placed on an intended place. The absorber is configured as a non-embossed region that includes a top side covering sheet facing the top sheet, a back side covering sheet facing the back sheet and an absorbent layer disposed between the top side covering sheet and the back side covering sheet. Further, a main absorbing region for excrement is provided in a central region of the absorber, and the basis weight of at least the main absorbing region of the absorber is set to be substantially uniform at a predetermined value in a range of 40 to 220 $g/m^2$, or more preferably 50 to 150 $g/m^2$.

In one aspect of the solution according to the present invention, at least one of the top side covering sheet and the back side covering sheet is bonded all over the absorbent layer via an adhesive.

In one aspect of the solution according to the present invention, the absorbent layer includes a first absorbent layer having hydrophilic fibers and a second absorbent layer having hydrophilic resin.

In one aspect of the solution according to the present invention, the second absorbent layer is disposed between the top side covering sheet and the first absorbent layer, and at least the top side covering sheet is bonded all over the second absorbent layer via the adhesive.

In one aspect of the solution according to the present invention, an average basis weight of the first absorbent layer is set to a predetermined value in a range of 30 to 150 $g/m^2$, or more preferably 40 to 100 $g/m^2$.

In one aspect of the solution according to the present invention, an average basis weight of the second absorbent layer is set to a predetermined value in a range of 10 to 70 $g/m^2$, or more preferably 10 to 50 $g/m^2$.

In one aspect of the solution according to the present invention, the first absorbent layer is formed of a pulp material.

In one aspect of the solution according to the present invention, the second absorbent layer is formed of a highly absorbent polymer.

In one aspect of the solution according to the present invention, a method of manufacturing an absorbent sheet for pets is provided. The pet absorbent sheet has a liquid-permeable top sheet, a liquid-impermeable back sheet and an absorber that is disposed between the top sheet and the back sheet and absorbs excrement which has penetrated the top sheet. The top sheet is configured to receive excrement of pets with the back sheet placed on an intended place. The absorber has a top side covering sheet facing the top sheet, a back side covering sheet facing the back sheet and an absorbent layer disposed between the top side covering sheet and the back side covering sheet. The method of manufacturing the pet absorbent sheet is characterized in that an absorber having a non-embossed region is formed by feeding a laminate of the top side covering sheet, the back side covering sheet and the absorber to a pressing section having a pressing surface without concaves and convexes and pressing the laminate.

In one aspect of the solution according to the present invention, the pressing section is formed by a pressure roller having a curved pressing surface without concaves and convexes.

In one aspect of the solution according to the present invention, the thickness of the laminate which is already fed to the pressing section and pressed is fixed to a predetermined smaller value than that of the laminate which is not yet fed to the pressing section.

In one aspect of the solution according to the present invention, the pet absorbent sheet has a main absorbing region for excrement in a central region of the absorber, and the basis weight of at least the main absorbing region of the absorber is set to be substantially uniform at a predetermined value in a range of 40 to 220 $g/m^2$, or more preferably 50 to 150 $g/m^2$.

In one aspect of the solution according to the present invention, the pet absorbent sheet is formed by bonding the top sheet and the back sheet to the absorber after the absorber is manufactured from the laminate.

Effect of the Invention

According to the present invention, a technique for effectively absorbing excrement in an absorbent sheet for pets is provided.

REPRESENTATIVE EMBODIMENT FOR CARRYING OUT THE INVENTION

Figure 1:
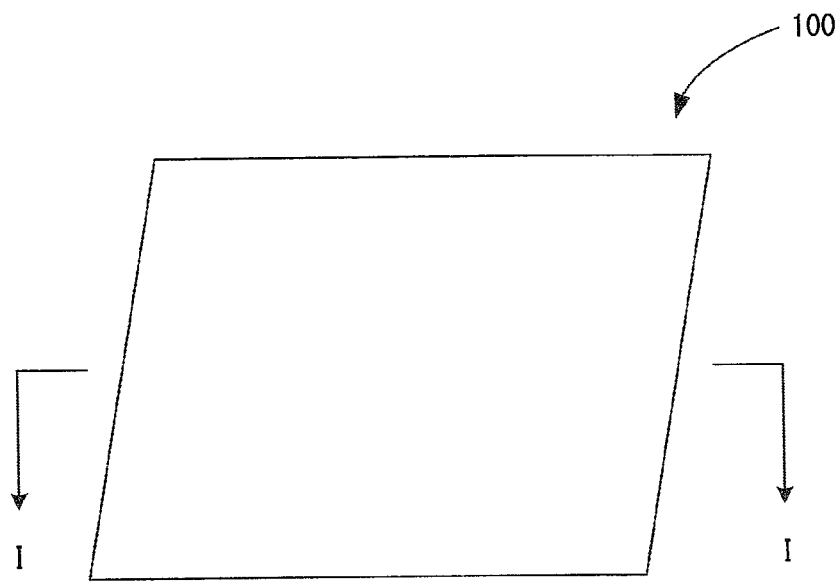
FIG. 1 schematically shows an overall structure of a pet absorbent sheet 100 according to a first embodiment of the present invention.

Representative modes for carrying out the present invention are now described. Embodiments of the present invention relate to an absorbent sheet for pets and a method for manufacturing the same. The "pet" in the embodiments widely includes vertebrates (mammals, reptiles, birds and amphibians) and invertebrates, and typically represents pets such as cats, dogs, rabbits and hamsters.

The absorbent sheet for pets (pet absorbent sheet) has a liquid-permeable top sheet, a liquid-impermeable back sheet and an absorber that is disposed between the top sheet and the back sheet and absorbs excrement which has penetrated the top sheet. The top sheet and the back sheet are also referred to as a top sheet and a bottom sheet, respectively.

This pet absorbent sheet is a flat sheet having a predetermined thickness. The pet absorbent sheet has a pet use mode in which the sheet is spread out flat with the back sheet placed on an intended place and receives excrement of pets. The pet absorbent sheet according to the embodiments preferably has a rectangular or square shape, but it may have a circular, elliptical or polygonal shape.

The "excrement of pets" here widely includes not only urine, but body fluids such as saliva and menstrual blood. In the pet use mode, the top sheet forms a planar structure serving both as a flat excrement receiving surface (hereinafter also referred to as a main absorbing region) for receiving excrement of a pet in non-contact with the pet and as a pet walking surface on which the pet can walk.

The manner of placing the pet absorbent sheet on the "intended place" includes a manner of directly placing the pet absorbent sheet on floor or the like, and a manner of setting the pet absorbent sheet on a holder and placing it on floor or the like.

Preferably, the top sheet and the back sheet are formed to be slightly larger than the absorber, and a peripheral edge of the top sheet and a peripheral edge of the back sheet are bonded together with the absorber disposed therebetween. Thus, the absorber can be reliably covered by the top sheet and the back sheet.

The top sheet may be preferably formed, for example, of thermoplastic nonwoven fabric, including spun-bond nonwoven fabric of thermoplastic long fibers, air-through nonwoven fabric of thermoplastic short fibers, point-bond nonwoven fabric and perforated film.

The back sheet may be preferably formed particularly of a resin film sheet in order to ensure its liquid-impermeability. For example, a film of polyethylene, polypropylene or polyethylene terephthalate may be used to form the back sheet. Further, in consideration of flexibility, the back sheet may be formed by a nonwoven fabric to which a water repellent is applied.

The absorber includes a top side covering sheet facing the top sheet, a back side covering sheet facing the back sheet and an absorbent layer disposed between the top side covering sheet and the back side covering sheet.

Each covering sheet is also referred to as a carrier tissue and can be formed, for example, of a tissue of conifer pulp. Further, the covering sheet may also be formed as a thermoplastic nonwoven fabric sheet, particularly a sheet including melt-blow nonwoven fabric. Specifically, the covering sheet may have a three-layer structure in which spun-bond nonwoven fabric is overlaid on the both sides of the melt-blow nonwoven fabric sheet. This three-layer nonwoven fabric sheet is also referred to as an "SMS nonwoven fabric sheet".

The covering sheet of the embodiments itself may be formed of an absorbent material or have absorbency. Alternatively, the covering sheet itself may be formed of a liquid-permeable material or have liquid-permeability, and the absorbent layer may be provided to be responsible for absorbing and retaining liquid.

The "absorbent layer" may have a multi-layered structure of a plurality of absorbent members different in material, property or absorbing characteristic, or a single-layer structure of a single absorbent member. As a material of the absorbent layer, an absorbent resin material or fiber assembly is typically used.

The absorber according to this invention is configured as a non-embossed region having a top side covering sheet facing the top sheet, a back side covering sheet facing the back sheet and an absorbent layer disposed between the top side covering sheet and the back side covering sheet. The "non-embossed region" corresponds to a region which is not subjected to embossing. The "embossing" here is a technique for press-forming a predetermined concave or convex pattern in an absorbent sheet by feeding and pressing a sheet material onto a roll or a plate having concaves or convexes. Further, in the embodiments, a smooth and flat absorber having no embossed surface and having a uniform basis weight can be formed by not subjecting to such embossing In the embodiments of this invention, a main absorbing region for excrement is provided in a central region of the absorber, and the basis weight of at least the main absorbing region of the absorber is set to be substantially uniform at a predetermined value in the range of 40 to 220 g/m$^2$, or more preferably 50 to 150 g/m$^2$.

In the prior art pet absorbent sheet, a region having a relatively different basis weight is formed in the absorber by embossing and a liquid component of excrement unnecessarily widely diffuses along a region having a high basis weight. In the embodiments of this invention, however, by forming the absorber as a non-embossed region, the basis weight of the absorber can be uniformized, so that a liquid component of excrement can be effectively prevented from excessively diffusing. Further, in the prior art technique, layers of the pet absorbent sheet are press-bonded together by embossing, but in the embodiments of this invention, as described above, the pet absorbent sheet is integrally formed by bonding at least one of the top side covering sheet and the back side covering sheet all over the absorbent layer via an adhesive. Therefore, further by forming the absorber as a non-embossed region, ensuring the bonding strength and preventing excessive diffusion of excrement can be effectively secured. The non-embossed region in this invention is provided to avoid local increase of the basis weight of the absorber which may be caused by embossing. In consideration of this, if such increase can be avoided, even an absorber having a slightly convex/concave region shall be included in the non-embossed region in this invention.

In a preferred aspect of the embodiments, preferably, the absorbent layer is configured to have a first absorbent layer having hydrophilic fibers and a second absorbent layer having water-absorbent resin and disposed between the top side covering sheet and the first absorbent layer, and the first absorbent layer has an average basis weight of 30 to 150 g/m$^2$, or more preferably 40 to 100 g/m$^2$. Alternatively or in addition, preferably, the absorbent layer is configured to have a first absorbent layer having hydrophilic fibers and a second absorbent layer having water-absorbent resin and disposed between the top side covering sheet and the first absorbent layer, and the second absorbent layer has an average basis weight of 10 to 70 g/m$^2$, or more preferably 10 to 50 g/m$^2$.

Further, in a preferred aspect of the embodiments, preferably, at least one of the top side covering sheet and the back side covering sheet is bonded all over the absorbent layer via an adhesive. The manner in which "at least one" of the top side covering sheet and the back side covering sheet is bonded to the absorbent layer means that it is sufficient for the absorbent layer to be fixed to either one of the covering sheets. Naturally, it may be bonded to both of the top and back side covering sheets. Being bonded "all over" the absorbent layer means that it is sufficient for the absorbent layer to be entirely bonded to at least one of the top side covering sheet and the back side covering sheet, and suitably includes both the manner of applying an adhesive over an entire surface (100%) of the absorbent layer, and the manner of bonding the entire surface of the absorbent layer to the covering sheet by partially applying an adhesive to the surface of the absorbent layer. For example, when the absorbent layer is bonded to the top side covering sheet via an adhesive, preferably, the adhesive is applied in a discontinuous pattern such as a spiral, lattice-like, striped or dotted pattern in order to secure a liquid penetrating passage from the top sheet to the absorbent layer. Even in such a case, the requirement of bonding "all over" the absorbent layer in this invention shall be satisfied.

As the above-described adhesive, a heat sealable adhesive is preferably used. The heat sealable adhesive is also referred to as a hot-melt adhesive (HMA), which is melted by heating and exhibits adhesiveness.

According to the embodiments of this invention, by bonding at least one of the top side covering sheet and the back side covering sheet all over the absorbent layer of the absorber via the adhesive, the absorbent layer can be securely bonded to the covering sheet. As a result, relative movement of the absorbent layer in the absorber is restricted, so that the absorbent layer can be prevented from impairing usability by accidentally moving or floating up during use of the pet absorbent sheet.

Further, in a preferred aspect of the embodiments, preferably, the absorbent layer is configured to have a first absorbent layer having hydrophilic fibers and a second absorbent layer having hydrophilic resin. In this regard, the pet absorbent sheet of this invention is a technique relating to a structure of absorbing liquid in excrement such as urine and feces of pets, and the object to be absorbed is not necessarily limited to "water" in the narrow sense, but it widely includes liquid. Thus it typically represents a technique of absorbing moisture of excrement of pets. Therefore, in the embodiments, use of "hydrophilic" fibers or resin is preferred. For example, the first absorbent layer is preferably formed of a pulp material having an average basis weight of 60 g/m$^2$. The second absorbent layer is preferably formed of hydrophilic resin, particularly a highly absorbent polymer excellent in water absorbing properties. The highly absorbent polymer may be a polymer blend formed of a blend of a plurality of highly absorbent polymers (also referred to as "SAP" or super absorbent polymers). The highly absorbent polymer of the second absorbent layer preferably has an average basis weight of 39 g/m$^2$. Further, in the highly absorbent polymer, the liquid absorption speed by a vortex method is preferably set to 10 seconds or less.

In a preferred aspect of the embodiments, preferably, the second absorbent layer is disposed between the top side covering sheet and the first absorbent layer and at least the top side covering sheet is bonded all over the second absorbent layer via the adhesive. Further, preferably, the back side covering sheet is bonded all over the first absorbent layer via the adhesive. By provision of this structure, the components of the absorber can be reliably and securely bonded together.

In a preferred aspect of the embodiments, a method of manufacturing an absorbent sheet for pets is provided. The pet absorbent sheet has a liquid-permeable top sheet, a liquid-impermeable back sheet and an absorber that is disposed between the top sheet and the back sheet and absorbs excrement which has penetrated the top sheet. The top sheet is configured to receive excrement of pets with the back sheet placed on an intended place. The absorber has a top side covering sheet facing the top sheet, a back side covering sheet facing the back sheet and an absorbent layer disposed between the top side covering sheet and the back side covering sheet. Preferably, the method of manufacturing the pet absorbent sheet is characterized in that an absorber having a non-embossed region is formed by feeding a laminate of the top side covering sheet, the back side covering sheet and the absorber to a pressing section having a pressing surface without concaves and convexes and pressing the laminate. The "non-embossed region" corresponds to a region which is not subjected to embossing. The "embossing" here is a technique for press-forming a predetermined concave or convex pattern in an absorbent sheet by feeding and pressing a sheet material onto a roll or a plate having concaves or convexes. Further, in the embodiments, a smooth and flat absorber having no embossed surface and having a uniform basis weight can be formed by not subjecting to such embossing. The non-embossed region in this invention is provided to avoid local increase of the basis weight of the absorber which may be caused by embossing. In consideration of this, if such increase can be avoided, even an absorber having a slightly convex/concave region shall be included in the non-embossed region in this invention.

In a preferred aspect of the embodiments, preferably, the pressing section is formed by a pressure roller having a curved pressing surface without concaves and convexes. Further, the thickness of the laminate which is already fed to the pressing section and pressed is fixed to a predetermined smaller value than that of the laminate which is not yet fed to the pressing section.

In a preferred aspect of the embodiments, preferably, the pet absorbent sheet has a main absorbing region for excrement in a central region of the absorber, and the basis weight of at least the main absorbing region of the absorber is set to be substantially uniform at a predetermined value in the range of 40 to 220 g/m$^2$, or more preferably 50 to 150 g/m$^2$. By thus uniformizing the basis weight of the main absorbing region for excrement in the predetermined range, excrement or its liquid component can be effectively prevented from excessively diffusing along a region having relatively high basis weight.

Embodiments
(First Embodiment)

In light of the above, a first embodiment of the present invention is now explained in detail with reference to FIGS. 1 to 6.

Figure 2:
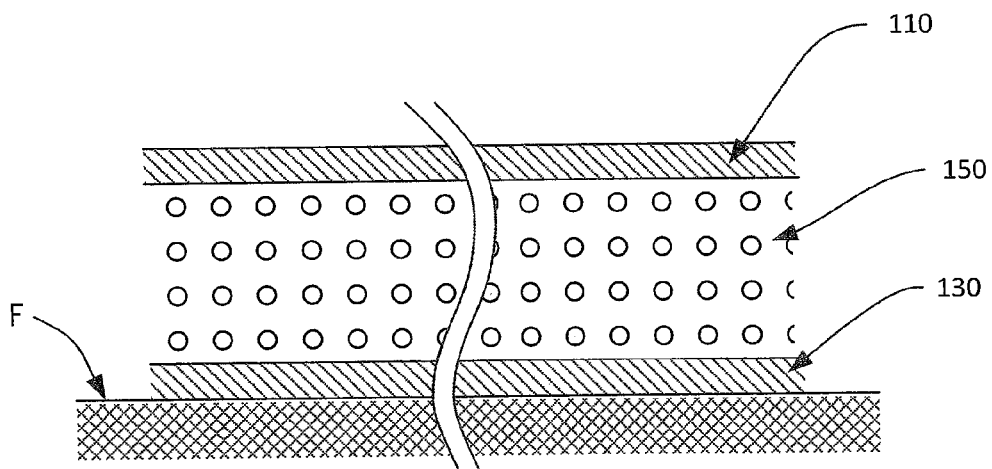
FIG. 2 schematically shows a sectional structure in sectional view taken along line I-I in FIG. 1.

FIG. 1 is a perspective view showing the overall structure of a pet absorbent sheet 100 according to the first embodiment of the present invention. FIG. 2 schematically shows a sectional structure of the pet absorbent sheet 100 in sectional view taken along line I-I in FIG. 1. The pet absorbent sheet 100 mainly includes a top sheet 110, a back sheet 130 which is placed on a placing surface F, and an absorber 150 disposed between the top sheet 110 and the back sheet 130. The top sheet 110, the back sheet 130 and the absorber 150 are example embodiments that correspond to the "top sheet", the "back sheet" and the "absorber", respectively, according to this invention.

The top sheet 110 can be formed, for example, of thermoplastic nonwoven fabric, including spun-bond nonwoven fabric of thermoplastic long fibers, air-through nonwoven fabric of thermoplastic short fibers, point-bond nonwoven fabric and perforated film. The back sheet 120 is formed of a resin film sheet.

Figure 3:
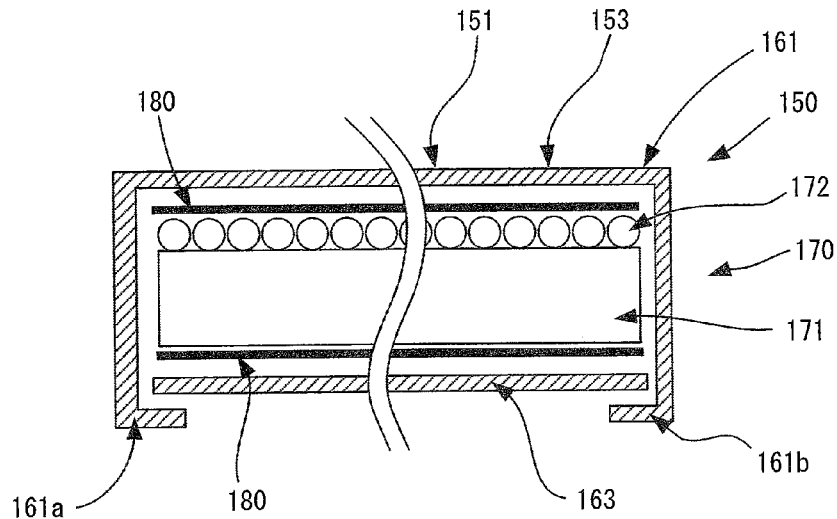
FIG. 3 schematically shows a sectional structure of an absorber according to the first embodiment of the invention.

The detailed structure of the absorber 150 of the pet absorbent sheet 100 is shown in FIG. 3 in sectional view. The absorber 150 has a top side tissue layer 161 and a back side tissue layer 163 which form an outer shell structure of the absorber 150, and an absorbent layer 170. The absorbent layer 170 is covered by the tissue layers 161, 163 and has a pulp layer 171 forming a first absorbent layer and a highly absorbent polymer layer 172 forming a second absorbent layer. This invention is an improved technique relating to a structure of absorbing liquid components in excrement of pets, and the object to be absorbed is not necessarily limited to "water" in the narrow sense, but it includes urine, saliva and menstrual blood. In this embodiment, however, for the sake of convenience of explanation, the term "water absorbing" is also used as a representative example. The top side tissue layer 161, the back side tissue layer 163 and the absorbent layer 170 are example embodiments that correspond to the "top side covering sheet", the "back side covering sheet" and the "absorbent layer", respectively, according to this invention. Further, the pulp layer 171 is an example embodiment that corresponds to the "pulp material" or the "first absorbent layer" according to this invention. The highly absorbent polymer layer 172 is an example embodiment that corresponds to the "second absorbent layer" according to this invention.

The highly absorbent polymer layer 172 in this embodiment is disposed between the top side tissue layer 161 and the pulp layer 171. As shown in FIG. 3, the top side tissue layer 161 has bent parts 161a, 161b which are formed by bending an edge region of the top side tissue layer so as to be lapped over an edge region of the back side tissue layer 163. By provision of this structure, the absorbent layer 170 is reliably covered.

The top side tissue layer 161 and the back side tissue layer 163 are formed of a tissue.

The pulp layer 171 forming the first absorbent layer is formed by stacking a pulp material so as to have an average basis weight of about 60 g/m$^2$. The highly absorbent polymer 172 forming the second absorbent layer is configured as a resin layer formed of a blend of a plurality of highly absorbent polymer materials (also referred to as "SAP" or super absorbent polymers) and having an average basis weight of about 39 g/m$^2$. In the highly absorbent polymer 172, the liquid absorption speed by the vortex method is set to 10 seconds or less, so that the liquid absorption speed in the absorber 150 (the absorbent layer 170) is optimized.

As shown in FIG. 3, in this embodiment, the top side tissue layer 161 is bonded all over the surface of the highly absorbent polymer layer 172 by a hot-melt adhesive 180. Further, the back side tissue layer 163 is bonded all over the lower surface of the pulp layer 171 by the hot-melt adhesive 180. The hot-melt adhesive 180 is also referred to as HMA (hot melting adhesive). In this embodiment, the hot-melt adhesive 180 is applied to the tissue layers 161, 163 in a spiral pattern so that the liquid permeability of the absorbent layer 170 and the tissue layers 161, 163 are ensured.

In light of excellent flexibility and press-bonding property, the hot-melt adhesive 180 in this embodiment is formed of a rubber hot-melt adhesive including SIS (styrene-isopropylene-styrene copolymer) or SBS (styrene-butadiene-styrene copolymer), and its basis weight is set to a predetermined value in the range of about 0.3 to 2.0 g/m$^2$. The hot-melt adhesive 180 is an example embodiment that corresponds to the "adhesive" or the "heat sealable adhesive" according to this invention.

Figure 4:
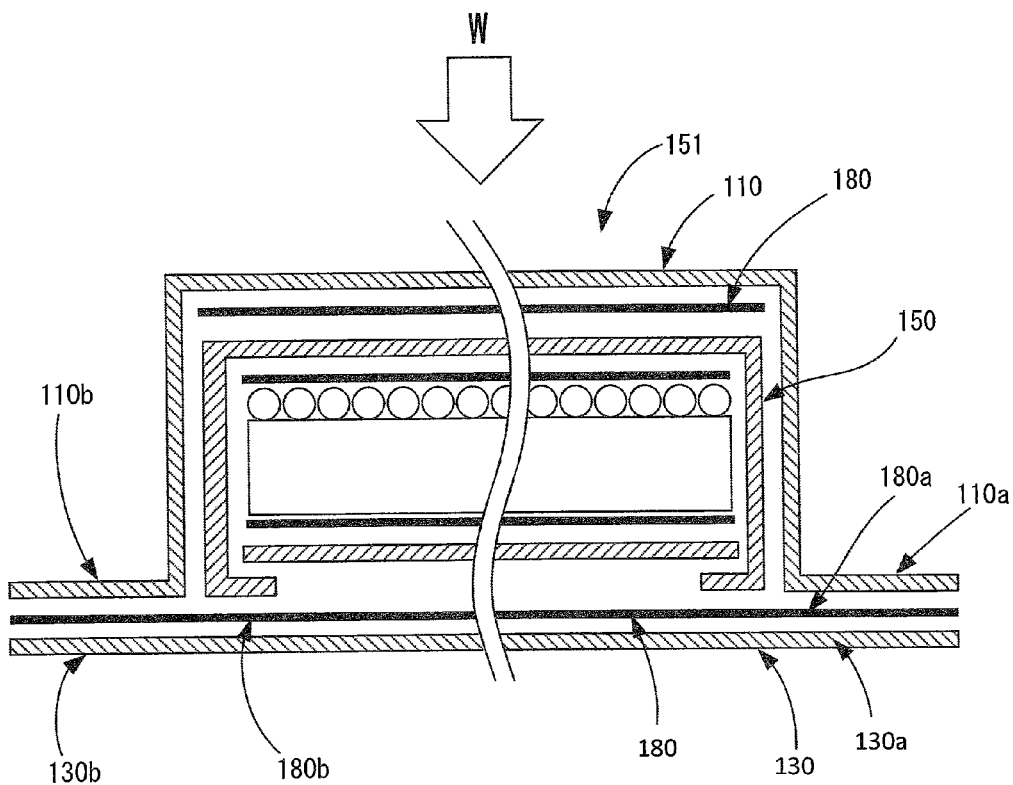
FIG. 4 schematically shows a detailed structure of a pet absorbent sheet 100 according to the first embodiment of the invention.

As shown in FIG. 4, the above-described absorber 150 is disposed between the top sheet 110 and the back sheet 130. Substantially the entire surface of the absorber 150 is bonded to each of the top sheet 110 and the back sheet 130 via the hot-melt adhesive 180. Further, the top sheet 110 and the back sheet 130 are longer than the absorber 150 in cross-sectional view. Edge regions 110a, 110b of the top sheet 110 are directly bonded to edge regions 130a, 130b of the back sheet 130 via extending end regions 180a, 180b of the hot-melt adhesive 180 without interposing the absorber 150. Thus, the absorber 150 is entirely covered with the top sheet 110 and the back sheet 130, so that the absorber 150 can be prevented from being directly exposed to the outside in use of the pet absorbent sheet 100.

In this manner, the pet absorbent sheet 100 according to this embodiment is formed as shown in FIG. 4. In this state, a substantially central region of the pet absorbent sheet 100 is defined as a main absorbing region 151 and is configured to receive excrement W in the pet absorbent sheet 100 placed on the placing surface F (also see FIG. 2). The main absorbing region 151 is an example embodiment that corresponds to the "main absorbing region" according to this invention.

The basis weight of a region of the absorber 150 corresponding to the main absorbing region 151 is set to be substantially uniform at a predetermined value in the range of 40 to 220 g/m$^2$, or more preferably 50 to 150 g/m$^2$. By provision of such a structure, excrement or its liquid component can be effectively prevented from excessively diffusing along a region having relatively high basis weight.

Figure 5:
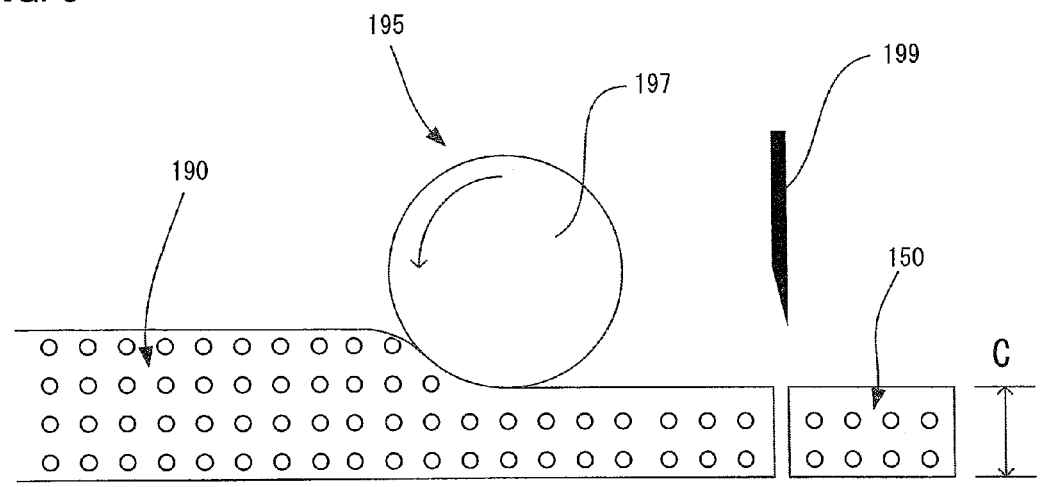
FIG. 5 schematically shows a manufacturing process of the pet absorbent sheet 100 according to the first embodiment of the invention.

A method of manufacturing the above-described pet absorbent sheet 100 is now explained with reference to FIGS. 5 and 6. FIG. 5 shows a method of manufacturing the absorber 150 of the pet absorbent sheet 100.

First, in a preparation step, in order to form the absorber 150 shown in FIG. 3, a laminate 190 is prepared in which the pulp layer 171, the highly absorbent polymer layer 172, the top side tissue layer 161 and the back side tissue layer 163 are laid one on the other in advance and the hot-melt adhesive 180 is disposed between the highly absorbent polymer layer 172 and the top side tissue layer 161 and between the pulp layer 171 and the back side tissue layer 163. Then, as shown in FIG. 5, the laminate 190 is fed to a pressing section 195. The pressing section 195 mainly includes a pressure roller 197. As shown in FIG. 5, the pressure roller 197 has a prescribed pressing clearance C and is configured to compression-mold the fed laminate 190 according to the pressing clearance C. In this embodiment, the pressing clearance C is set to 1.6 mm, and the thickness of the pressed laminate 190 is fixed to a predetermined smaller value than that of the laminate 190 which is not yet fed to the pressing section 195.

A cylindrical pressing surface of the pressure roller 197 has a flat surface structure having almost no irregularities or undulations. Therefore, the laminate 190 is only compressed (or heated) in the above-described pressing step and is avoided from being subjected to embossing like the prior art pet absorbent sheet.

Further, the pressure roller 197 in this embodiment is heated to 100° C., so that the hot-melt adhesive in the laminate 190 is melted by pressing. The melted hot-melt adhesive is solidified as the temperature decreases after the pressing process, and bonds the layers forming the absorber 150 together.

The pressure-compressed laminate 190 as described above is cut to a prescribed size by a cutter 199 so that the absorber 150 is obtained.

Figure 6:
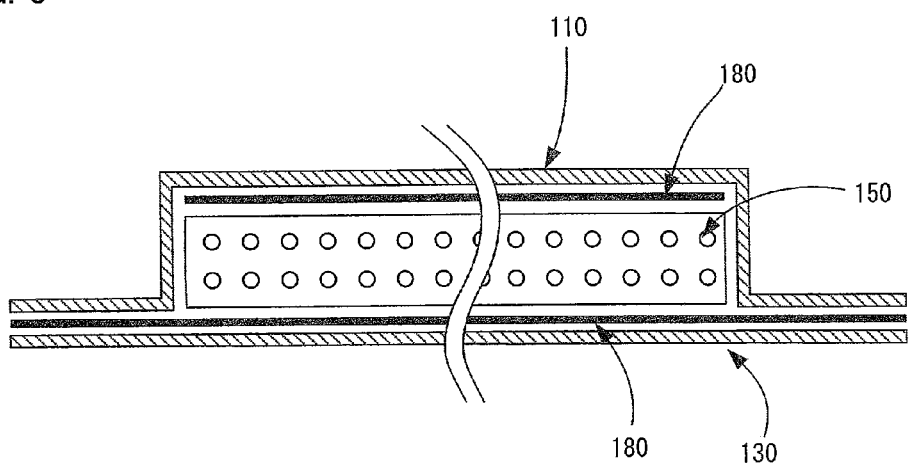
FIG. 6 schematically shows the manufacturing process of the pet absorbent sheet 100 according to the first embodiment of the invention.

Next, as shown in FIG. 6, the top sheet 110 and the back sheet 130 are placed on the upper side and the lower side of the absorber 150, respectively, with the hot-melt adhesive 180 disposed therebetween and are bonded to the absorber 150 by heat sealing. In this manner, the pet absorbent sheet 100 shown in FIG. 4 is manufactured.

In the method of manufacturing the pet absorbent sheet 100 according to this embodiment, as for the structure of the pressing section 195 for compressing the laminate 190 to manufacture the absorber 150, the cylindrical pressing surface of the pressure roller 197 has a flat surface structure having almost no irregularities or undulations. Therefore, the laminate 190 is only compressed (or heated) in the above-described pressing step and is not subjected to embossing like in the prior art pet absorbent sheet. Specifically, the absorber 150 manufactured by the above-described manufacturing method, including the main absorbing region 151 shown in FIG. 4, is entirely formed as a non-embossed region, and is configured such that the absorbent layer 170 is bonded to the top sheet 110 or the back sheet 130 by the adhesive action of the hot-melt adhesive disposed therebetween. The prior art pet absorbent sheet has a region which is strongly compressed by embossing and a region which is not strongly compressed, so that a region having a relatively different basis weight is formed in the absorber and a liquid component of excrement unnecessarily widely diffuses along a region having a high basis weight. In the pet absorbent sheet 100 according to this embodiment, however, by forming the absorber 150 as a non-embossed region, the basis weight of the absorber can be uniformized, so that a liquid component of excrement can be effectively prevented from excessively diffusing.

Further, performance evaluation was conducted on the pet absorbent sheet 100 according to the first embodiment and the prior art pet absorbent sheet having an embossed region.

Specifically, an absorber is prepared in which 9 g of a highly absorbent polymer layer having the liquid absorption speed by the vortex method of 3.4 seconds is uniformly applied to the top of a pulp layer of 60 gsm. Then, a sample is prepared by fixing this absorber by the heat sealable adhesive according to the above-described embodiment, and a comparison sample is also prepared by embossing this absorber. In the comparison sample, the upper layer side of the absorber is embossed in a lattice pattern having a lattice width of 1.5 mm to form an embossed region in which a number of rectangular non-compressed regions having a length of one side of 10 mm and compressed regions having a width of 1.5 mm are alternately and continuously formed.

The liquid diffusibility of the sample and the comparison sample was confirmed.

Specifically, the liquid diffusibility of the pet absorbent sheet is determined by using the liquid diffusion area calculated by the following method.

(1) First, a vinyl chloride tube having an outer diameter of 66.6 mm, an inner diameter of 60.2 mm and a height of 53 mm is placed on a measurement point of the pet absorbent sheet 100 excluding a fold.

(2) Next, 40 cc of 0.9% saline is dropped in 6 seconds onto the center of the vinyl chloride tube from 10 mm above the pet absorbent sheet 100 by using a burette of 40 cc/6 sec.

(3) Then, after the elapse of 5 minutes after dropping the saline, the diffusion length of the saline in a prescribed first direction and the diffusion length of the saline in a second direction crossing the first direction are measured. In this embodiment, the first direction is defined as the MD direction (machine direction) or feeding direction in the manufacturing apparatus in the operation of manufacturing the pet absorbent sheet 100, and the second direction is defined as the CD direction (cross direction) crossing the MD direction.

(4) From the measured first and second diffusion lengths, the liquid diffusion area (cm$^2$) is calculated by using the following formula.

$$[(\text{first direction diffusion length}/2) \times (\text{second direction diffusion length}/2) \times 3.14]$$

As a result, the speed of absorbing the saline was about 40 seconds in the comparison sample and about 33 seconds in the sample of this embodiment. The diffusion area of the saline was about 217 cm² in the comparison sample and about 178 cm² in the sample of this embodiment. From the above-described confirmation work, it was confirmed that, compared with the prior art having the embossed region, in the sample of this embodiment, wide diffusion of the saline is effectively prevented while the speed of absorbing the saline is relatively increased.

(Second Embodiment)

Figure 7:
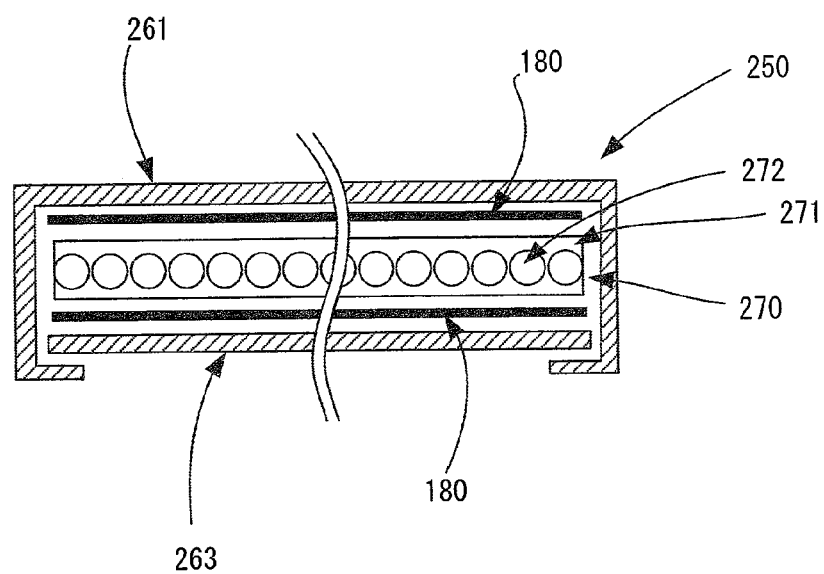
FIG. 7 schematically shows a sectional structure of a pet absorbent sheet according to a second embodiment of the invention.

A second embodiment of the present invention is now explained with reference to FIG. 7. The second embodiment relates to a modification to the arrangement of the absorber 150 in the above-described pet absorbent sheet 100 according to the first embodiment, and the structures of the other members or components are the same as in the first embodiment.

In the second embodiment, an absorbent layer 270 of an absorber 250 has a pulp layer 271 forming a first absorbent layer and a highly absorbent polymer layer 272 provided within the pulp layer 271 and forming a second absorbent layer. In other words, the second absorbent layer or highly absorbent polymer layer 272 is held between layers of the first absorbent layer or pulp layer 271. The absorber 150 is formed by bonding the top surface and the back surface of the pulp layer 271 as viewed in FIG. 7 to a top side tissue layer 261 and a back side tissue layer 263 via the hot-melt adhesive 180.

(Correspondences Between the Features of the Embodiments and the Features of the Invention)

The pet absorbent sheet 100 is an example embodiment that corresponds to the "absorbent sheet for pets" according to this invention. The top sheet 110 is an example embodiment that corresponds to the "top sheet" according to this invention. The back sheet 130 is an example embodiment that corresponds to the "back sheet" according to this invention. The absorber 150 is an example embodiment that corresponds to the "absorber" according to this invention. The main absorbing region 151 is an example embodiment that corresponds to the "main absorbing region" according to this invention. The top side tissue layer 161 is an example embodiment that corresponds to the "top side covering sheet" according to this invention. The back side tissue layer 163 is an example embodiment that corresponds to the "back side covering sheet" according to this invention. The absorbent layer 170 is an example embodiment that corresponds to the "absorbent layer" according to this invention. The pulp layer 171 is an example embodiment that corresponds to the "pulp material" or the "first absorbent layer" according to this invention. The highly absorbent polymer layer 172 is an example embodiment that corresponds to the "second absorbent layer" according to this invention. The hot-melt adhesive 180 is an example embodiment that corresponds to the "adhesive" or the "heat sealable adhesive" according to this invention. The laminate 190 is an example embodiment that corresponds to the "laminate" according to this invention. The pressing section 195 is an example embodiment that corresponds to the "pressing section" according to this invention. The pressure roller 197 is an example embodiment that corresponds to the "pressure roller" according to this invention.

In view of the nature of the above-described invention, various features can be provided as follows.

(Aspect 1)

An absorbent sheet for pets, comprising:
a liquid-permeable top sheet that receives excrement of pets,
a liquid-impermeable back sheet, and an absorber that is disposed between the top sheet and the back sheet and absorbs liquid which has penetrated the top sheet, wherein:
the top sheet is configured to receive excrement of pets with the back sheet placed on an intended place,
the absorber is configured as a non-embossed region that includes a top side covering sheet facing the top sheet, a back side covering sheet facing the back sheet and an absorbent layer disposed between the top side covering sheet and the back side covering sheet, and
a main absorbing region for excrement is provided in a central region of the absorber, and the basis weight of at least the main absorbing region of the absorber is set to be substantially uniform at a predetermined value in a range of 40 to 220 g/m².

(Aspect 2)

The absorbent sheet for pets as defined in aspect 1, wherein at least one of the top side covering sheet and the back side covering sheet is bonded all over the absorbent layer via an adhesive.

(Aspect 3)

The absorbent sheet for pets as defined in aspect 1 or 2, wherein the absorbent layer includes a first absorbent layer having hydrophilic fibers and a second absorbent layer having hydrophilic resin.

(Aspect 4)

The absorbent sheet for pets as defined in aspect 3, wherein the second absorbent layer is disposed between the top side covering sheet and the first absorbent layer, and at least the top side covering sheet is bonded all over the second absorbent layer via the adhesive.

(Aspect 5)

The absorbent sheet for pets as defined in aspect 3 or 4, wherein an average basis weight of the first absorbent layer is set to a predetermined value in a range of 40 to 100 g/m².

(Aspect 6)

The absorbent sheet for pets as defined in any one of aspects 3 to 5, wherein an average basis weight of the second absorbent layer is set to a predetermined value in a range of 10 to 50 g/m².

(Aspect 7)

The absorbent sheet for pets as defined in aspect 5 or 6, wherein the first absorbent layer is formed of a pulp material.

(Aspect 8)

The absorbent sheet for pets as defined in any one of aspects 5 to 7, wherein the second absorbent layer is formed of a highly absorbent polymer.

(Aspect 9)

A method of manufacturing an absorbent sheet for pets, having a liquid-permeable top sheet, a liquid-impermeable back sheet and an absorber that is disposed between the top sheet and the back sheet and absorbs excrement which has penetrated the top sheet, the top sheet being configured to receive excrement of pets with the back sheet placed on an intended place, and the absorber including a top side covering sheet facing the top sheet, a back side covering sheet facing the back sheet and an absorbent layer disposed between the top side covering sheet and the back side covering sheet, wherein:
an absorber having a non-embossed region is formed by feeding a laminate of the top side covering sheet, the back side covering sheet and the absorber to a pressing section having a pressing surface without concaves and convexes and pressing the laminate.

(Aspect 10)

The manufacturing method as defined in aspect 9, wherein the pressing section comprises a pressure roller having a curved pressing surface without concaves and convexes.

(Aspect 11)

The manufacturing method as defined in aspect 9 or 10, wherein the thickness of the laminate which is already fed to the pressing section and pressed is fixed to a predetermined smaller value than that of the laminate which is not yet fed to the pressing section.

(Aspect 12)

The manufacturing method as defined in any one of aspects 9 to 11, wherein the pet absorbent sheet has a main absorbing region for excrement in a central region of the absorber, and the basis weight of at least the main absorbing region of the absorber is set to be substantially uniform at a predetermined value in a range of 40 to 220 g/m².

(Aspect 13)

The manufacturing method as defined in any one of aspects 9 to 12, wherein the pet absorbent sheet is formed by bonding the top sheet and the back sheet to the absorber after the absorber is manufactured from the laminate.

DESCRIPTION OF THE NUMERALS

100 pet absorbent sheet (absorbent sheet for pets)
110 top sheet (top sheet)
130 back sheet (back sheet)
150 absorber (absorber)
151 main absorbing region (main absorbing region)
161 top side tissue layer (top side covering sheet)
163 back side tissue layer (back side covering sheet)
170 absorbent layer (absorbent layer)
171 pulp layer (pulp material, first absorbent layer)
172 highly absorbent polymer layer (second absorbent layer)
180 hot-melt adhesive (heat sealable adhesive)
190 laminate (laminate)
195 pressing section (pressing section)
197 pressure roller (pressure roller)
199 cutter
C pressing clearance (pressing clearance)
F placing surface
W excrement

The invention claimed is:

1. An absorbent sheet for pets, comprising:
a liquid-permeable top sheet that is adapted to receive excrement of pets,
a liquid-impermeable back sheet, and
an absorber that is disposed between the top sheet and the back sheet and is adapted to absorb liquid which has penetrated the top sheet, wherein:
the top sheet is configured to receive excrement of pets with the back sheet placed on an intended place,
the absorber is shaped as a non-embossed region that includes a top side covering sheet facing the top sheet, a back side covering sheet facing the back sheet and the absorber having a first absorbent layer and a second absorbent layer each disposed between the top side covering sheet and the back side covering sheet, and
a main absorbing region for excrement is provided in a central region of the absorber, and the basis weight of at least the main absorbing region of the absorber is substantially uniform at a predetermined value in a range of 50 to 150 g/m²,
wherein:
at least one of: i) the top side covering sheet being bonded all over the second absorbent layer; and ii) the back side covering sheet being bonded all over the first absorbent layer via an adhesive;
the top side covering sheet extends across and defines a top surface of the absorber and further extends so as to define a portion of a back surface of the absorber;
the first absorbent layer having hydrophilic fibers and the second absorbent layer having hydrophilic resin;
the second absorbent layer is disposed between the top side covering sheet and the first absorbent layer, and at least the top side covering sheet is bonded all over the second absorbent layer via the adhesive;
a basis weight of the first absorbent layer is in a range of 40 to 100 g/m²; and
a basis weight of the second absorbent layer is in a range of 10 to 50 g/m².

2. The absorbent sheet for pets as defined in claim 1, wherein the first absorbent layer is formed of a pulp material.

3. The absorbent sheet for pets as defined in claim 1, wherein the second absorbent layer is formed of a super absorbent polymer.

* * * * *